United States Patent
O'Donnell et al.

(10) Patent No.: US 9,044,818 B2
(45) Date of Patent: Jun. 2, 2015

(54) METHOD OF WELDING TWO SIDES OF A JOINT SIMULTANEOUSLY

(75) Inventors: Timothy M. O'Donnell, Chesterland, OH (US); Michael S. Flagg, Aurora, OH (US)

(73) Assignee: Lincoln Global, Inc., City of Industry, CA (US)

( * ) Notice: Subject to any disclaimer, the term of this patent is extended or adjusted under 35 U.S.C. 154(b) by 1292 days.

(21) Appl. No.: 11/969,540

(22) Filed: Jan. 4, 2008

(65) Prior Publication Data

US 2009/0120919 A1    May 14, 2009

Related U.S. Application Data

(60) Provisional application No. 60/986,461, filed on Nov. 8, 2007.

(51) Int. Cl.
| | |
|---|---|
| B23K 9/09 | (2006.01) |
| B23K 9/10 | (2006.01) |
| B23K 9/12 | (2006.01) |
| B23K 33/00 | (2006.01) |
| B23K 35/30 | (2006.01) |
| B23K 9/18 | (2006.01) |

(52) U.S. Cl.
CPC ............ *B23K 9/188* (2013.01); *B23K 33/004* (2013.01); *B23K 9/1062* (2013.01); *B23K 9/092* (2013.01)

(58) Field of Classification Search
CPC .... B23K 9/1006; B23K 9/186; B23K 9/0209; B23K 9/1062; B23K 9/287; B23K 9/092; B23K 9/0956; B23K 9/091; B23K 9/1068; B23K 33/004; B23K 26/246; B23K 26/067

USPC ...... 219/130.1, 73, 126, 137 R, 130.5, 125.1, 219/121.64, 121.63, 137 PS, 130.21, 219/130.51, 130.31

See application file for complete search history.

(56) References Cited

U.S. PATENT DOCUMENTS

| | | | | |
|---|---|---|---|---|
| 2,763,770 | A | * | 9/1956 | Arnold .......................... 219/126 |
| 2,764,668 | A | * | 9/1956 | Dumoulin ................. 219/137 R |
| 2,938,107 | A | * | 5/1960 | Pease ....................... 219/137.71 |
| 3,182,179 | A | * | 5/1965 | Anderson, Sr. ........... 219/137 R |
| 3,319,043 | A | * | 5/1967 | Rohrberg .................. 219/137 R |
| 3,342,973 | A | * | 9/1967 | Smith et al. ............... 219/137 R |
| 3,437,787 | A | * | 4/1969 | Chyle ....................... 219/137 R |

(Continued)

FOREIGN PATENT DOCUMENTS

| | | |
|---|---|---|
| GB | 884947 A | 12/1961 |
| GB | 1033932 A | 6/1966 |
| WO | 2008008560 A | 1/2008 |

OTHER PUBLICATIONS

Miller Electric Mfg. Co., "Submerged ARC Welding" (Rev. 11/85); pp. 1-28; Appleton, WI.

(Continued)

*Primary Examiner* — Dana Ross
*Assistant Examiner* — Hemant Mathew
(74) *Attorney, Agent, or Firm* — Perkins Coie LLP

(57) ABSTRACT

A system for arc welding two sides of a joint simultaneously is disclosed. By customizing welding waveforms and the distance between two or more electrodes, weld currents can be designed to transfer current to and through one or more electrodes in addition to the current traditionally passed only to the common node.

37 Claims, 7 Drawing Sheets

(56) References Cited

U.S. PATENT DOCUMENTS

| | | | | |
|---|---|---|---|---|
| 3,475,587 A | * | 10/1969 | Budds et al. | 219/137 R |
| 3,585,351 A | * | 6/1971 | Hinrichs | 219/121.13 |
| 3,588,660 A | * | 6/1971 | Purkhiser | 318/658 |
| 3,596,051 A | * | 7/1971 | Nomura | 219/137 R |
| 3,704,358 A | * | 11/1972 | Saito et al. | 219/73 |
| 4,001,539 A | * | 1/1977 | Franchi et al. | 219/110 |
| 4,420,672 A | * | 12/1983 | Nolt, Jr. | 219/73.1 |
| 4,806,735 A | * | 2/1989 | Ditschun et al. | 219/130.5 |
| 4,983,805 A | * | 1/1991 | Kengle | 219/101 |
| 5,194,709 A | * | 3/1993 | Ichikawa et al. | 219/109 |
| 5,532,445 A | * | 7/1996 | Junker | 219/61 |
| 5,990,446 A | * | 11/1999 | Zhang et al. | 219/137 PS |
| 6,172,333 B1 | * | 1/2001 | Stava | 219/137 PS |
| 6,232,572 B1 | * | 5/2001 | Kanjo | 219/110 |
| 6,291,798 B1 | * | 9/2001 | Stava | 219/130.32 |
| 6,940,040 B2 | * | 9/2005 | Houston et al. | 219/130.51 |
| 7,495,193 B2 | * | 2/2009 | Myers et al. | 219/130.51 |
| 2005/0189334 A1 | | 9/2005 | Stava | |
| 2006/0207983 A1 | * | 9/2006 | Myers et al. | 219/137 PS |
| 2006/0237409 A1 | * | 10/2006 | Uecker et al. | 219/130.5 |
| 2008/0011727 A1 | * | 1/2008 | Peters | 219/130.5 |

OTHER PUBLICATIONS

The Lincoln Electric Company, "Making Butt Welds With Power Wave AC/DC 1000(TM) Technology" (NX-3.60, Oct. 2005); pp. 1-12.

International Search Report dated May 13, 2009.

U.S. Appl. No. 11/457,609, Decision on Appeal—Affirmed, 15 pages, Jun. 2, 2014.

* cited by examiner

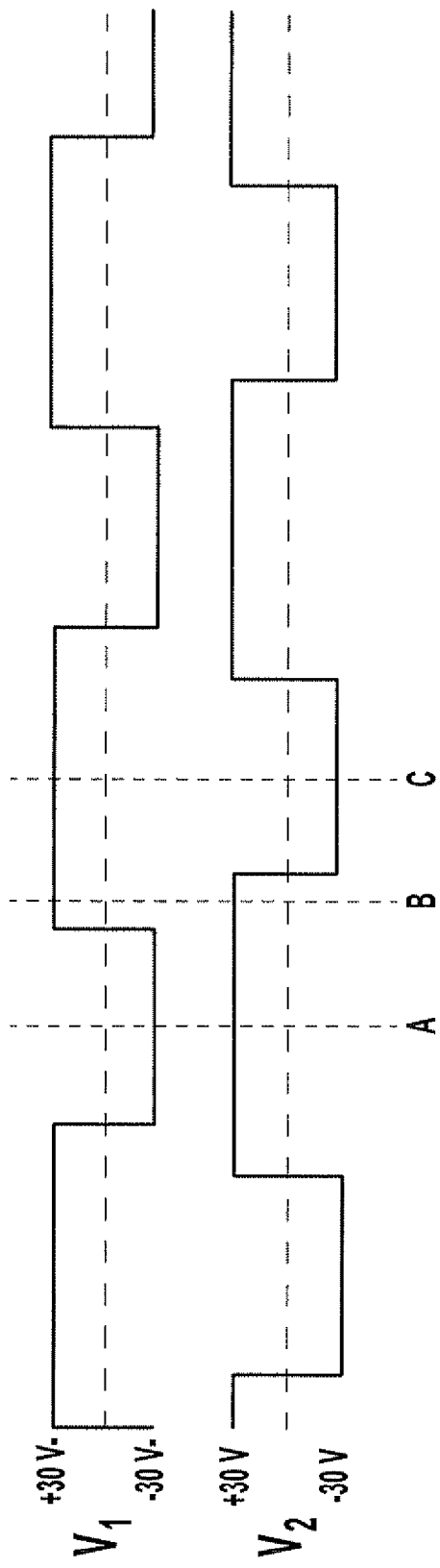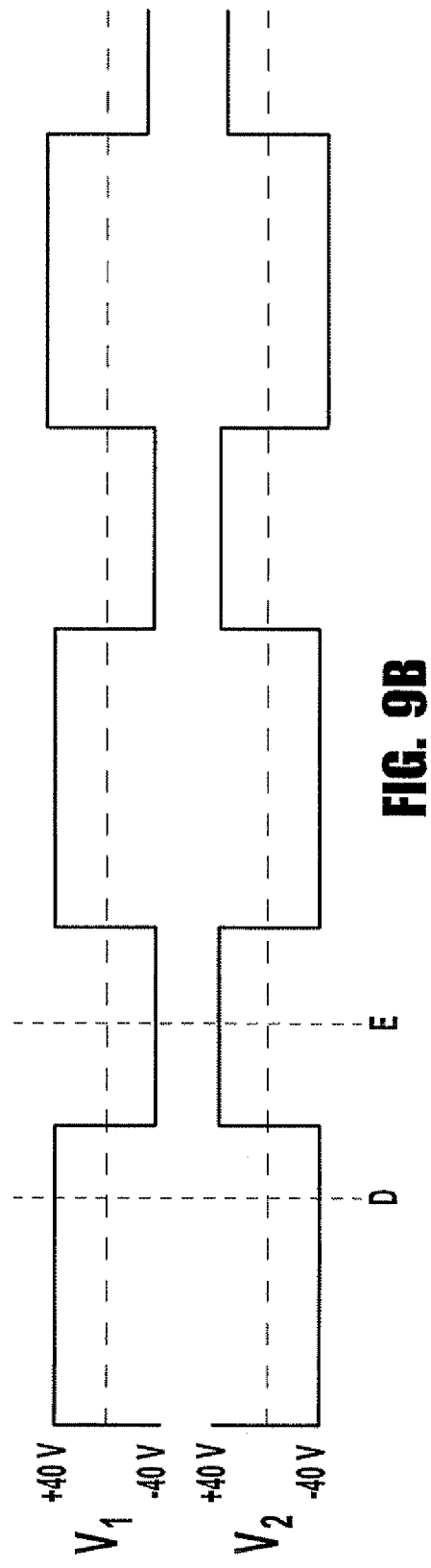

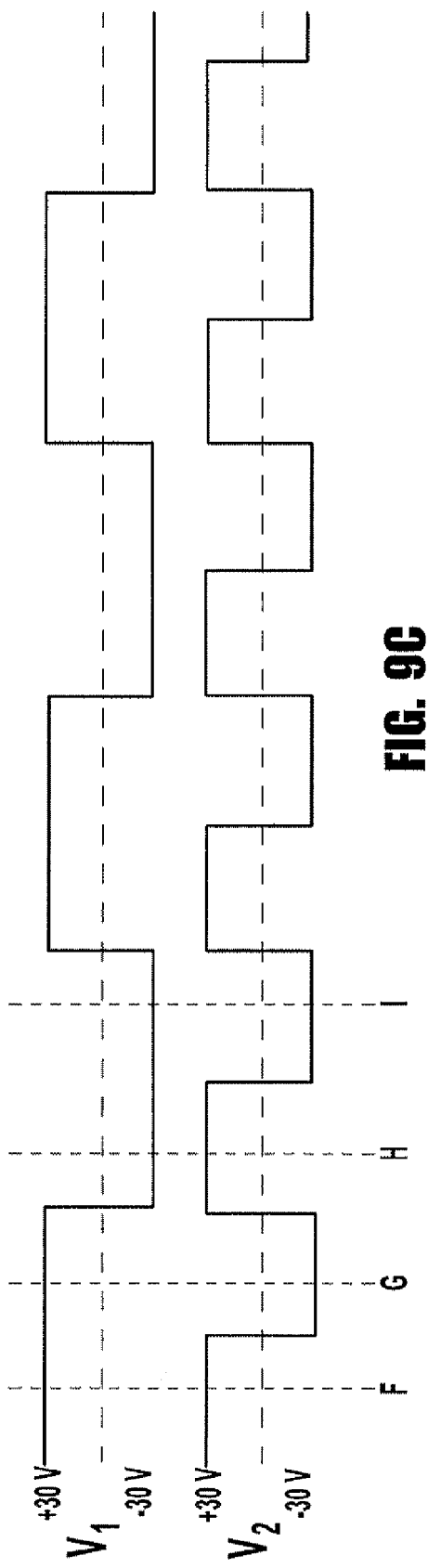

METHOD OF WELDING TWO SIDES OF A JOINT SIMULTANEOUSLY

CROSS-REFERENCE TO RELATED APPLICATION

This application is based upon and claims the benefit of priority from U.S. Provisional Application 60/986,461 filed on Nov. 8, 2007 in the United States Patent and Trademark Office, the disclosure of which is incorporated herein by reference in its entirety.

BACKGROUND

1. Field of the Invention

The present invention relates to the art of electric arc welding and improved methods of welding two sides of a joint simultaneously.

2. Background

Submerged arc welding is a welding method where the arc creating the weld is shielded from atmospheric conditions by being submerged in a blanket of granular flux. In addition, the flux becomes molten during the welding process and provides a path for the current to travel to the metal workpiece (or "base") being welded. Submerged arc welding can be performed with a DC or AC power source and typically uses high output currents. Where AC power sources are used, square wave sources are often employed. Using AC square waves rather than sinusoidal waves reduces the likelihood of having to re-strike the electrode to create an arc again.

Making welds on two sides of a piece of base metal can be difficult and prone to more defects and greater distortion than normal. In particular, welding both sides of a base for butt welds and fillet welds is complex for a number of reasons. FIGS. 1A-C show two plates of base metal joined with a butt weld. FIGS. 2A-C show two plates of base metal joined with a fillet weld. The edges to be welded are often welded flat as shown in FIGS. 1A and 2A or ground to a beveled edge as shown in FIGS. 1B and 2B. An example of a completed butt weld is shown in FIG. 1C and a completed fillet weld in FIG. 2C. Butt welds and fillet welds often require welding on two sides as shown in FIGS. 1A-C and 2A-C. These two-sided welds have been created by welding one side at a time or welding both sides simultaneously.

One method of welding two sides of a base metal is to weld both sides with two DC electrodes at the same time where both electrodes are either DC positive or DC negative. However, placing two DC electrodes close together often leads to arc blow. Arc blow occurs when a magnetic field interferes with the arc, causing it to wander as the weld is made. Arc welding often employs high currents that create strong magnetic fields near the arc and ground currents. These magnetic fields can push the arc around and create a wandering weld bead rather than a tight, controlled weld bead. Logically, arc blow presents a significant problem for a two-sided weld using a DC power source because the two arcs are close enough that their magnetic fields can interfere with each other. This has been solved by using a "leading" electrode and a "lagging" electrode, where the two electrodes are separated by usually at least four feet. That is, the two opposing electrodes travel along the weld joint at the same rate and in the same direction, but the leading electrode is positioned in front of the lagging electrode by at least four feet. The electrodes are separated to prevent arc blow and held at the same DC potential to force the current to flow through the base to the common node of the circuit.

This leading-lagging DC method, however, is prone to defects. For example, the weld pool from the leading electrode begins to cool and can start to solidify by the time the lagging electrode reaches it. This can introduce cracks in the weld bead. In addition, the separation between the electrodes and weld pools creates an uneven distribution of heat as the weld is created and the metal begins to solidify. This uneven heat distribution can cause distortion because the weld solidifies unevenly or can bend under the weight of the heavy metal base. Thus, while this solution provides a relatively quick weld, it is prone to defects.

The most common method with butt welds involves welding one side first, performing a back gouging step, and then welding the second side. This method can be performed using either DC or AC power sources, but is customarily performed with DC power supplies. The weld starts by affixing a backing to the location of the weld, which is often a copper plate (FIGS. 3A and 4A). Next, the first side of the base is welded—often with deep penetration and a high deposition rate depositing a significant amount of weld material (FIG. 3B). Many times, the butt weld is prepared by beveling the first side of the base, which then usually requires multiple passes to fill the open space (FIGS. 4A and 4B). After welding the first side, the backing is removed and the second side is "back gouged". Back gouging cuts a bevel in the second side and removes a mix of metal from the base and some material deposited during the first weld (FIGS. 3C and 4C). After the second side is back gouged, it can finally be welded (FIGS. 3D and 4D). This solution provides a strong weld that is relatively free of defects, but it requires significant material and is a slow process. Currently, using DC positive with back gouging is the method most commonly used for butt welds in the 2G position.

A solution is needed to weld both sides of a base simultaneously and create a strong weld that is not prone to cracking or distortion. Such a solution would save welders the significant extra costs in labor and equipment currently caused by slower processes.

SUMMARY

In one embodiment, a method of arc welding two sides of a joint simultaneously comprises: supplying a first welding waveform to a first electrode using a first power source; supplying a second welding waveform to a second electrode using a second power source; welding a weld joint that requires a first side and a second side to be welded; welding the first side with the first electrode; welding the second side with the second electrode; transferring current from the first electrode to the second electrode, or from the second electrode to the first electrode; and moving the first and second electrodes along the weld joint in the same direction and at or near the same speed.

In another embodiment, a system for arc welding two sides of a joint simultaneously comprises: a first power source connected to and supplying a first welding waveform to a first electrode; a second power source connected to and supplying a second welding waveform to a second electrode; a first and second base metal positioned such that a weld joint is to be welded on a first side and a second side; the first electrode is positioned to weld the first side; the second electrode is positioned to weld the second side; the first and second electrodes move along the weld joint in the same direction and at or near the same speed; and current transfers from the first electrode to the second electrode, or from the second electrode to the first electrode.

BRIEF DESCRIPTION OF THE DRAWINGS

FIGS. 9A-C illustrate several voltage waveforms used in the circuit of FIG. 8.

DETAILED DESCRIPTION

Figure 1A:
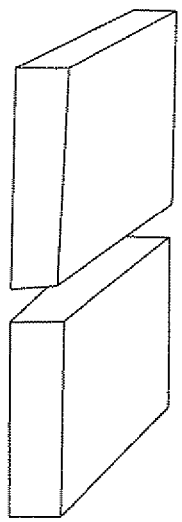
FIGS. 1A-1C illustrate a weld created in the 2G position.
Figure 2A:
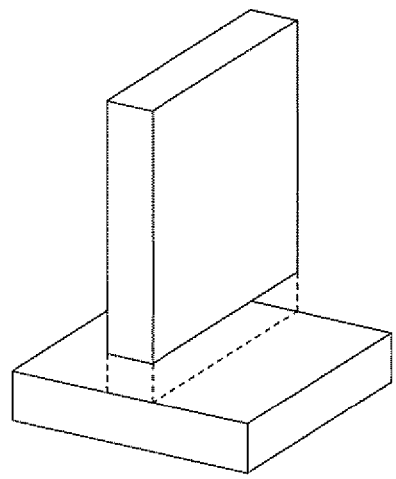
FIGS. 2A-2C illustrate a weld created in the 2F position.
Figure 1B:
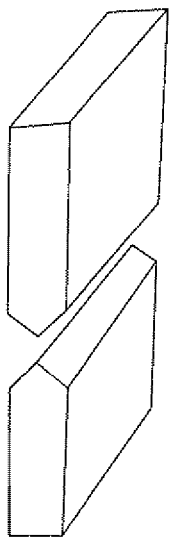
Figure 2B:
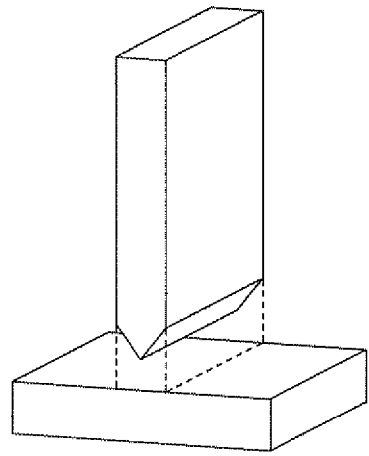
Figure 1C:
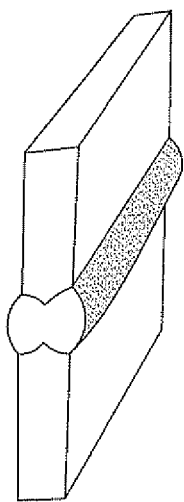
Figure 2C:
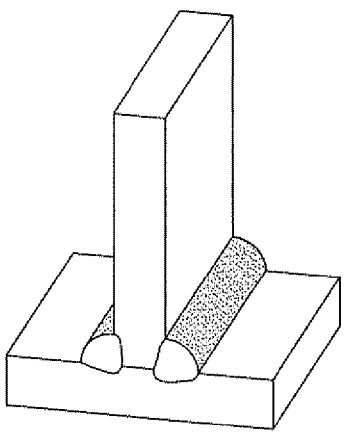
Figure 3A:
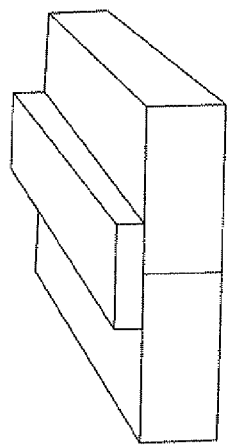
FIGS. 3A-3D illustrate a back gouged 2G weld.
Figure 4A:
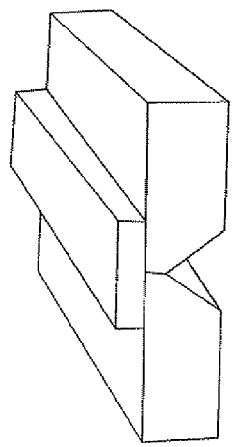
FIGS. 4A-4D illustrate another back gouged 2G weld.
Figure 3B:
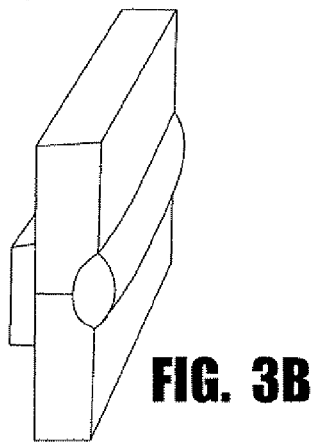
Figure 4B:
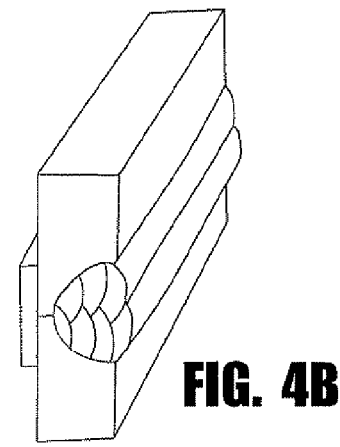
Figure 3C:
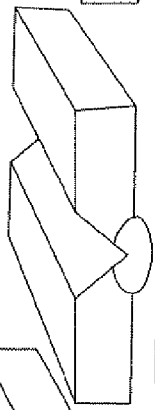
Figure 4C:
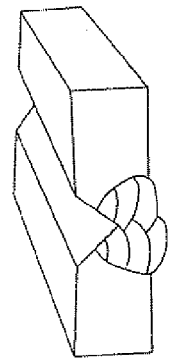
Figure 3D:
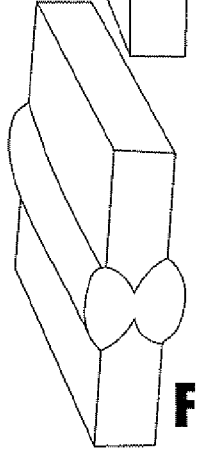
Figure 4D:
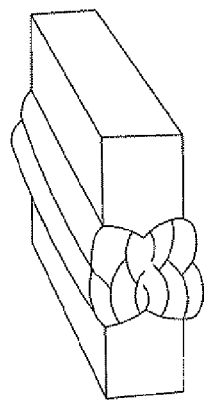
Figure 5:
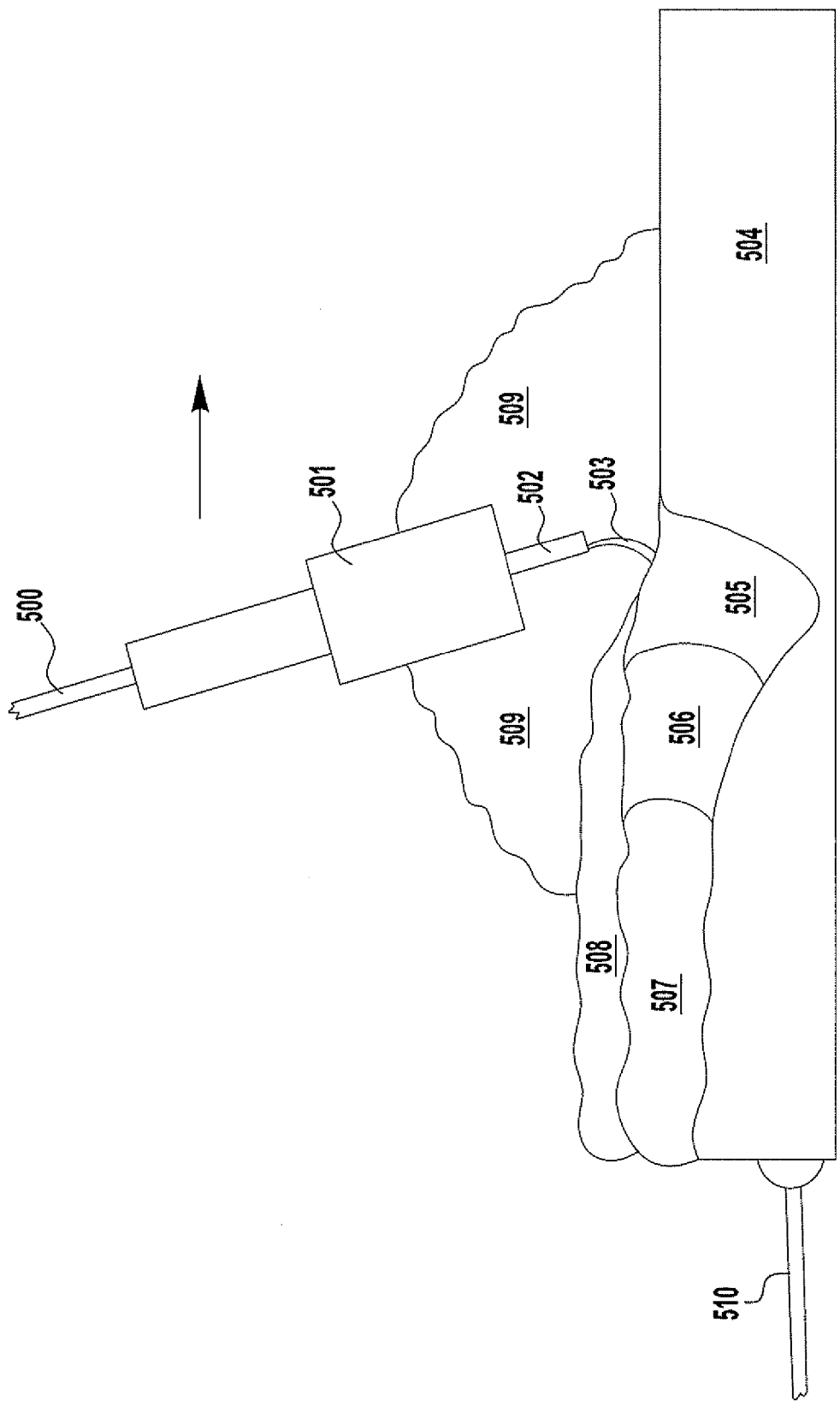
FIG. 5 depicts a submerged arc welding process.

FIG. 5 depicts a submerged arc welding process. A spool of welding wire (not shown) supplies wire 500 to electrode 501 where it is electrically connected to the welding power source (not shown). Wire 500 passes through electrode 501 and protrudes as electrode wire 502. As the weld proceeds, the metal in electrode wire 502 is consumed, requiring wire 500 to be continually fed through electrode 501. This process is called "submerged" because granular flux 509 shields electrode wire 502 and arc 503 from atmospheric conditions. Granular flux 509 becomes molten near arc 503 and later solidifies as slag 508. Weld pool 505 contains melted metal from base 504 and electrode wire 502. As weld pool 505 cools, it begins to solidify in transition region 506 and results in a solid weld bead 507. Electrical contact 510 is connected to one terminal of the welding power supply and electrode wire 502 is connected to the other terminal of welding power supply, which completes the electrical circuit and allows current to flow from electrode wire 502 through base 504 to contact 510.

Figure 6:
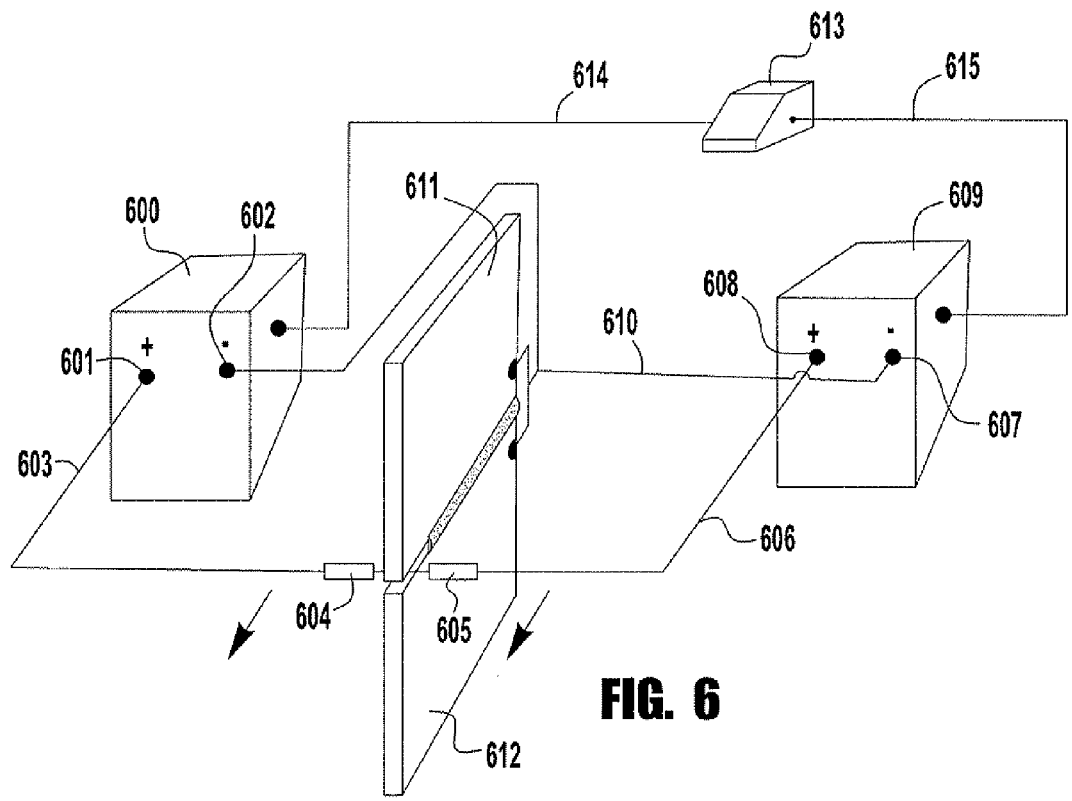
FIG. 6 depicts a system designed to weld both sides of a joint simultaneously according to an embodiment of the present invention.

In one embodiment, two electrodes are placed across from each other to weld a joint simultaneously from both sides of the joint. FIG. 6 shows a system designed to weld both sides of a joint simultaneously according to this embodiment. First welder 600 and second welder 609 provide AC power to perform the weld and contain programmable power sources capable of providing AC power at a variety of phase angles. First electrode 604 is connected to positive terminal 601 of first welder 600 via cable 603. Second electrode 605 is connected to positive terminal 608 of second welder 609 via cable 606. Electrodes 604 and 605 are positioned across from each other and proceed along the path of the weld joint (shown by the arrows) at the same rate. In one embodiment, electrodes 604 and 605 are positioned directly across from each other. In another embodiment, electrode 604 leads electrode 605 by some distance. In yet another embodiment, electrode 604 can proceed along the weld joint at a different rate than electrode 605. In the end of the process, base 611 and base 612 will be welded together. Common node 610 connects negative terminal 602, negative terminal 607, base 611, and base 612. Welders 600 and 609 are attached to controller 613 via cables 614 and 615, respectively. Controller 613 coordinates the welding waveforms produced by welders 600 and 609 so that the phase angle between the two welding waveforms is maintained. In other embodiments welders 600 and 609 communicate wirelessly with or without controller 613, or communicate via a cable without controller 613.

Weld programs can be supplied to welders 600 and 609 through a variety of methods including, for example: controls in or attached to the welder, controller 613, an external computer, a personal digital assistant (PDA), or a welding teach pendant. A weld program is a sort of recipe where an operator defines the parameters used to perform the weld (e.g., peak-to-peak voltage, shape of welding waveform, DC offset, or phase angle).

Further, in the embodiment depicted in FIG. 6, electrodes 604 and 605 are placed sufficiently close to promote the transfer of current from one electrode to the other. Positioning electrode 604 across from electrode 605 allows current to flow between the two electrodes depending on the respective potentials of electrodes 604 and 605. Thus, this arrangement allows the welding current to be (a) routed from first electrode 604 to second electrode 605, (b) routed from second electrode 605 to first electrode 604, or (c) routed from electrodes 604 and 605 to common node 610 through base 611 and base 612. By varying the two welding waveforms associated with electrodes 604 and 605, the current through the base material (bases 611 and 612) can be controlled or effectively shut off while welding. This gives the operator the option of creating two welding waveforms that allow most or all of the weld current to transfer between electrodes 604 and 605 via the weld pool in the weld created at the interface of bases 611 and 612. Controlling the amount and timing of the currents flowing between electrodes 604 and 605 or through bases 611 and 612 allows for highly customized weld programs. The weld can be customized to dictate how much heat is applied to bases 611 and 612 and how long the heat is generated per cycle. The weld can be further customized to dictate how fast wire 500 is being deposited. Prior solutions never afforded the level of customization attainable in the present embodiments.

Welders 600 and 609 are capable of operating in several operating modes. Welders 600 and 609 can control the weld by manipulating the amount of voltage, current or power supplied to the weld circuit. Accordingly, the term "welding waveform" refers to the voltage, current or power supplied to the weld circuit by an individual welder. For ease of explanation, the discussion below focuses on welding waveforms where the voltage is varied over time. Additional embodiments, however, are equally applicable where the current or power supplied from welder 600 or 609 varies over time.

By adjusting one or more weld parameters a welding operator can customize one or more of the following three current flows: (a) from electrode 604 to electrode 605; (b) from electrode 605 to electrode 604; or (c) through bases 611 and 612 to common node 610. The weld parameters that can be adjusted include: the phase angle between two welding waveforms, DC offset, frequency, magnitude, balance, or shape of one or both welding waveforms. These parameters can be adjusted alone or in combination to produce welding waveforms that create customized current flows. In AC welding applications, the "balance" of the welding waveform indicates the percentage of each cycle where the waveform is positive. For example, a voltage welding waveform with an 80 volt peak-to-peak square wave with 25% balance and +10 volts DC offset will be +50 volts for 25% of each cycle and −30 volts for 75% of each cycle. Square wave shaped welding waveforms are commonly used in AC arc welding, but many shapes can be used (e.g., sine, triangle, or sawtooth).

In one embodiment, a computer is used to adjust the weld parameters and supply weld programs to welders 600 and 609. This allows the operator to adjust the parameters that will affect the welding waveforms through a single interface. After creating a customized weld program on the computer, the weld program can be transferred to multiple welding systems easily through known communication devices (e.g., wired or wireless network connections, a PDA, or welding teach pendant). In another embodiment, a computer calculates the expected current flow for the three currents explained in the preceding paragraph by creating a simulation of the weld circuit. By using circuit simulation software, the operator can predict the current flows in the weld circuit based on welding waveforms created by adjusting the weld parameters. This allows the operator to postpone the actual weld operation until he has adjusted the weld parameters such that the simulator indicates that the desired current flows can be achieved.

Figure 7B:
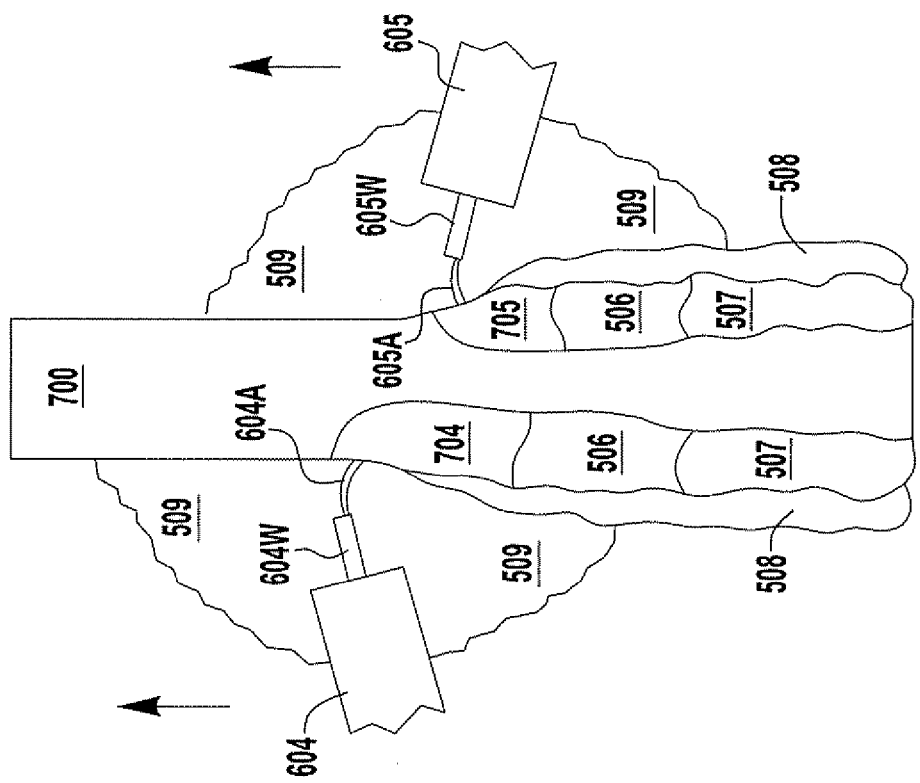
FIGS. 7A-7B depict close-up views of the weld in a system designed to weld both sides of a joint simultaneously in an embodiment of the present invention.
Figure 7A:
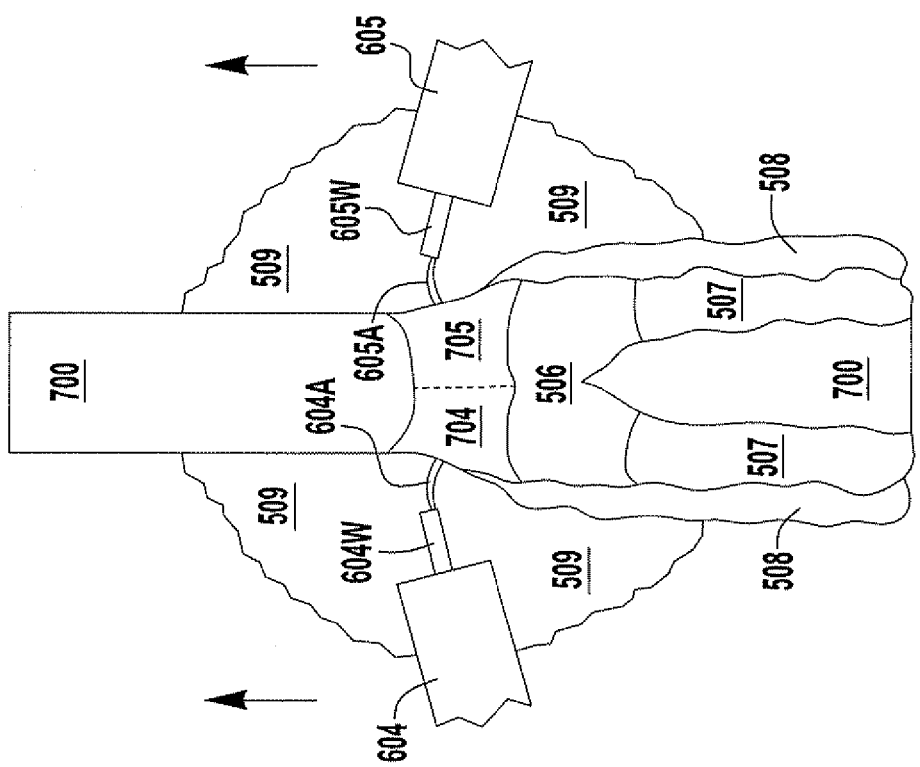

FIGS. 7A and 7B depict close-up views of the weld system depicted in FIG. 6. Here, the cross-sectional view of the weld shows base 700, which represents the interface of bases 611 and 612. In addition, electrode 604 creates weld pool 704 and electrode 605 creates weld pool 705. Weld pools 704 and 705 can merge as a common weld pool as shown in FIG. 7A or be separate weld pools as shown in FIG. 7B. In FIGS. 7A and 7B, arc 604A and electrode wire 604W correspond to electrode 604, while arc 605A and electrode wire 605W correspond to electrode 605. FIG. 7A illustrates one embodiment where electrodes 604 and 605 are positioned directly across from each other. This position allows for good current transfer between and through the electrodes.

FIG. 7B illustrates another embodiment where electrode 604 leads electrode 605 by some distance. In an exemplary embodiment of the invention, the distance between leading electrode 604 and lagging electrode 605 in FIG. 7B is sufficient to allow current to transfer (i.e., current flow) between the two electrodes. When electrode 604 leads electrode 605 by up to 6 inches, good current transfer between and through the electrodes exists. However, sufficient current flow between and through electrodes 604 and 605 can still exist when the electrodes are separated by up to 12 or 18 inches. Clearly, the distance between electrodes 604 and 605 where current flow is good can vary depending on several factors. For example, thicker base metals 611 and 612 generally have lower resistance, different metals have different resistance values, or the cooling rate of a metal can affect the resistance in the path between electrodes 604 and 605. Generally, however, the resistance between electrode 604 and electrode 605 increases as the distance between them increases. Moreover, weld pool 704 can begin to solidify if electrodes 604 and 605 are separated by too much distance. In one embodiment of the leading-lagging configuration in FIG. 7B, leading electrode 604 is placed approximately 2 to 3 inches ahead of lagging electrode 605. Test welds created with this 2 to 3 inch lead created well-shaped weld beads with good slag release and tensile strength properties. In addition, the results of this 2 to 3 inch test weld indicate that this embodiment performed well when subjected to a Charpy impact test. In another exemplary embodiment, lag is up to 2 inches.

FIG. 7A depicts a common weld pool shared by weld pools 704 and 705. In FIG. 7B, weld pools 704 and 705 are shown as being separate. In one embodiment, weld pools 704 and 705 of FIG. 7A are separate where, for example, the base metals are thicker or of different metals, the weld penetration is lower, or the metal cools rapidly. In another embodiment, weld pools 704 and 705 of FIG. 7B are shared in a common weld pool where, for example, the base metals are thin or of different metals, the weld penetration is high, the distance between electrodes 604 and 605 is relatively short, or the metal cools slowly. Welding with a common weld pool shared by weld pools 704 and 705 is beneficial because it allows for good current transfer.

Figure 8:
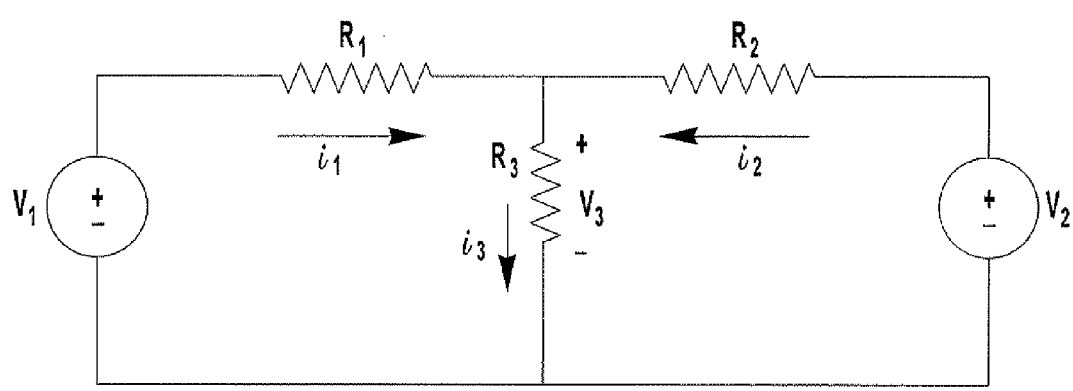
FIG. 8 depicts a simplified circuit representation of a system designed to weld both sides of a joint simultaneously in an embodiment of the present invention.

FIG. 8 depicts a simplified circuit representation of the welding system of FIG. 6. Here, $V_1$ represents the voltage supplied by first welder 600, $R_1$ represents the resistance between first welder 600 and weld pool 704 (largely due to the resistance at the arc), and $i_1$ represents the current through electrode 604. Similarly, $V_2$ represents the voltage supplied by second welder 609, $R_2$ represents the resistance between second welder 609 and weld pool 705 (largely due to the resistance at the arc), and $i_2$ represents the current through electrode 605. Finally, $V_3$ represents the voltage drop from weld pools 704 and 705 to common node 610, $R_3$ represents the resistance between weld pools 704 and 705 and common node 610 ($R_3$ is smaller than $R_1$ or $R_2$ because bases 611 and 612 are good conductors), and $i_3$ represents the current through bases 611 and 612 to common node 610.

FIG. 9A illustrates one embodiment where $V_1$ and $V_2$ are both 60 Hz 60 volt peak-to-peak square waves with a 60% wave balance. However, $V_2$ is out of phase with $V_1$ by 180° (i.e., $V_2$ lags $V_1$). At time point t=A, $V_1$ is −30 volts and $V_2$ is +30 volts, which causes all of the current to flow from $i_2$ back through $i_1$ with effectively no current running through $i_3$. That is, current is flowing from positive terminal 608 through second electrode 605 and first electrode 604 to positive terminal 601 (with almost no current flow towards common node 610). At time point t B, $V_1$ is +30 volts and $V_2$ is also +30 volts, which causes all of the current flow from $i_1$ and $i_2$ to feed into $i_3$. That is, all current flows from electrodes 604 and 605 through bases 611 and 612 to common node 610. At time point t=C, $V_1$ is +30 volts and $V_2$ is −30 volts, which causes all of the current to flow from $i_1$ through $i_2$ with effectively no current running through $i_3$. That is, current is flowing from positive terminal 601 through first electrode 604 and second electrode 605 to positive terminal 608 (with almost no current flow towards common node 610).

FIG. 9B illustrates one embodiment where $V_1$ and $V_2$ are both 60 Hz 80 volt peak-to-peak square waves where $V_1$ has a 60% wave balance and $V_2$ has a 40% wave balance and $V_2$ is out of phase with $V_1$ by 144°. At time point t=D, $V_1$ is +40 volts and $V_2$ is −40 volts, which causes all of the current to flow from $i_1$ through $i_2$ with effectively no current running through $i_3$. That is, current is flowing from positive terminal 601 through first electrode 604 and second electrode 605 to positive terminal 608 (with almost no current flow towards common node 610). At time point t=E, $V_1$ is −40 volts and $V_2$ is +40 volts, which causes all of the current to flow from $i_2$ back through $i_1$ with effectively no current running through $i_3$. That is, current is flowing from positive terminal 608 through second electrode 605 and first electrode 604 to positive terminal 601 (with almost no current flow towards common node 610). In test welds, the welding waveforms in this embodiment created well-shaped weld beads with good slag release and little arc blow.

FIG. 9C illustrates one embodiment where $V_1$ and $V_2$ are both 60 volt peak-to-peak square waves with a 50% wave balance. In addition, $V_1$ is a 60 Hz waveform, $V_2$ is a 120 Hz waveform, and $V_2$ is completely in phase with $V_1$. At time point t=F, $V_1$ is +30 volts and $V_2$ is also +30 volts, which causes all of the current flow from $i_1$ and $i_2$ to feed into $i_3$. That is, all current flows from electrodes 604 and 605 through bases 611 and 612 to common node 610. At time point t=G, $V_1$ is +30 volts and $V_2$ is −30 volts, which causes all of the current to flow from $i_1$ through $i_2$ with effectively no current running through $i_3$. That is, current is flowing from positive terminal 601 through first electrode 604 and second electrode 605 to positive terminal 608 (with almost no current flow towards common node 610). At time point t=H, $V_1$ is −30 volts and $V_2$ is +30 volts, which causes all of the current to flow from $i_2$ back through $i_1$ with effectively no current running through $i_3$. That is, current is flowing from positive terminal 608 through second electrode 605 and first electrode 604 to positive terminal 601 (with almost no current flow towards common node 610). Finally, at time point t=I, $V_1$ is −30 volts and $V_2$ is also −30 volts, which causes the current to flow from $i_3$ into $i_1$ and $i_2$. That is, all current flows from common node 610 through bases 611 and 612 then splits into two branches of current flowing into electrodes 604 and 605. In test welds, the welding waveforms in this embodiment created well-shaped weld beads with good slag release and little arc blow.

As evidenced by the embodiments explained above, the system depicted in FIG. 6 allows for highly customizable current flows (a) from electrode 604 to electrode 605; (b) from electrode 605 to electrode 604; and (c) through bases 611 and 612 to common node 610. The current flows can be highly customized by altering one or more of the following: the phase angle between $V_1$ and $V_2$; the DC offset of $V_1$ and/or $V_2$; the frequency of $V_1$ and/or $V_2$; the magnitude (e.g., peak-to-peak voltage) of $V_1$ and/or $V_2$; the balance of $V_1$ and/or $V_2$; or the shape of the waveform for $V_1$ and/or $V_2$ (e.g., square wave, sine wave, or triangular wave). Altering any one or a combination of the above parameters will result in different voltage waveforms for $V_1$ and $V_2$, which will result in different amounts of current flowing in $i_1$, $i_2$ and $i_3$ (i.e., between electrodes 604 and 605 and through bases 611 and 612). The system can be further customized by using multiple arcs on one or both sides of the weld.

In contrast to the embodiment depicted in FIG. 6, first and second welders 600 and 609 can also be connected as follows: positive terminal 601 to common node 610, negative terminal 602 to electrode 604, positive terminal 608 to common node 610, and negative terminal 607 to electrode 605.

In one embodiment, welders 600 and 609 are Power Wave® AC/DC 1000™ welders manufactured by The Lincoln Electric Company, which can be programmed to supply AC waveforms that are out of phase anywhere between 1° and 359°. In another embodiment, base 612 can be rotated 90° and welded as a fillet weld rather than a butt weld. In one embodiment, the butt weld is created in the 2G weld position. In another embodiment, the fillet weld is created in the 2F weld position.

It is noted that although the present invention has been discussed above specifically with respect to welding applications, the present invention is not limited to this and can be employed in any similar applications. While the invention has been described in terms of various specific embodiments, those skilled in the art will recognize that the invention can be practiced with modification within the spirit and scope of the claims.

What is claimed:

1. A method of arc welding comprising:
   providing a first current with a first welding waveform to a first electrode;
   providing a second current with a second welding waveform to a second electrode;
   welding a weld joint in an interface between a first base metal and a second base metal, each of the first and second base metals defining a first side and a second side opposite the first side of the base metal, the interface extending from the first side to the second side of at least one of the first and second base metals with the first electrode disposed on the first side of the at least one base metal and simultaneously welding with the second electrode disposed on the second side of the at least one base metal such that the first and second electrodes are disposed across the interface from each other;
   transferring the first current from the first electrode to the second electrode, or transferring the second current from the second electrode to the first electrode; and
   moving the first and second electrodes along the weld joint in a same direction and at or near a same speed.

2. The method of claim 1, wherein the first electrode leads the second electrode by up to 6 inches.

3. The method of claim 1, wherein the first electrode leads the second electrode by up to 12 inches.

4. The method of claim 1, wherein the second welding waveform is out of phase with the first welding waveform by some degree other than 45°, 60°, 90°, 120°, 180°, or 270°.

5. The method of claim 1, wherein the welding of the weld joint forms a butt weld.

6. The method of claim 5, wherein the welding of the weld joint is in the 2 G position.

7. The method of claim 1, wherein the welding of the weld joint forms a fillet weld.

8. The method of claim 7, wherein the welding of the weld joint is in the 2 F position.

9. The method of claim 1, wherein the first and second welding waveforms include simulated representations of the first and second welding waveforms that are supplied to a simulation circuit, the simulation circuit estimating at least a first estimated current flowing from the first electrode to the second electrode, or a second estimated current flowing from the second electrode to the first electrode.

10. A method, comprising:
    disposing a joint between opposing first and second electrodes, the joint being defined by an interface between a first base metal and a second base metal, each of the first and second base metal defining a first side and a second side opposite the first side of the base metal, the joint extending from the first side to the second side of at least one of the first and second base metals; and
    arc welding a first side of the joint with the first electrode disposed on the first side of the at least one base metal and simultaneously arc welding an opposing second side of the joint with the second electrode disposed on the second side of the at least one base metal, the first electrode receiving a first current provided by a first power source and a second current provided by a second power source, the second current received at the first electrode via the second electrode.

11. The method of claim 10, the second electrode receiving the first and second currents provided by the first and second power sources, the first current received at the second electrode via the first electrode.

12. The method of claim 10, the arc welding further comprising moving the first electrode along the joint in a position that leads the second electrode by up to six inches.

13. The method of claim 10, wherein the first power source provides a first welding waveform to the first electrode that is out of phase with a second welding waveform provided by the second power source, the second welding waveform being out of phase with the first welding waveform by some degree other than 45°, 60°, 90°, 120°, 180°, or 270°.

14. The method of claim 10, further comprising coordinating a change in a first power provided to the first electrode from the first power source with a change in a second power provided to the first electrode from the second power source.

15. The method of claim 14, the coordinating further comprising reducing the first power while increasing the second power.

16. A method, comprising:
using simultaneous arc welding processes to dispose a first weld pool on a first side of a joint proximate to a second weld pool disposed on an opposing second side of the joint, the joint being defined by an interface between a first base metal and a second base metal, each of the first and second base metal defining a first side and a second side opposite the first side of the base metal, the first side of the joint being disposed on the first side of at least one of the first and second base metals and the second side of the joint being disposed on the second side of the at least one base metal;
providing a first electrical energy from a first power source to the first weld pool via a first electrode; and
providing a second electrical energy from a second power source to the first weld pool via the second weld pool.

17. The method of claim 16, further comprising:
providing the second electrical energy from the second power source to the second weld pool via a second electrode; and
providing the first electrical energy from the first power source to the second weld pool via the first weld pool.

18. The method of claim 16, the arc welding process further comprising moving the first electrode along the joint in a position that leads a second electrode by up to six inches.

19. The method of claim 16, wherein the first power source provides a first welding waveform to the first electrode that is out of phase with a second welding waveform provided by the second power source, the second welding waveform being out of phase with the first welding waveform by some degree other than 45°, 60°, 90°, 120°, 180°, or 270°.

20. The method of claim 16, further comprising coordinating a change in a first power provided to the first electrode from the first power source with a change in a second power provided to the first electrode from the second power source.

21. The method of claim 1, the first current provided by a first power source, and the second current provided by a second power source.

22. The method of claim 21, the first or second power source comprising a welder.

23. The method of claim 10, the first or second power source comprising a welder.

24. The method of claim 16, the first or second power source comprising a welder.

25. A method of welding two sides of a joint simultaneously comprising:
disposing a first electrode and a second electrode about a base metal defining a joint such that said base metal extends between said first and said second electrode with said first electrode being across said joint from said second electrode;
simultaneously applying a first welding waveform to said first electrode and applying a second welding waveform to said second electrode;
proceeding with said first electrode along a weld path defined by said joint; and
proceeding with said second electrode along said weld path,
wherein a portion of said first welding waveform is transferred from said first electrode to said second electrode and a portion of said second welding waveform is transferred from said second electrode to said first electrode so as to weld two sides of said joint simultaneously.

26. The method of welding of claim 25, wherein said first and said second welding waveforms are AC welding waveforms.

27. The method of welding of claim 26, wherein said first and second electrodes proceed along said weld path in the same direction with one of said electrodes leading other of said electrodes by a distance of up 18 inches.

28. The method of welding of claim 27, wherein said one of said electrodes leads said other of said electrodes by a distance of up 6 inches.

29. The method of welding of claim 26, wherein simultaneously applying a first welding waveform to said first electrode and applying a second welding waveform to said second electrode defines a first weld arc along said welding path defined by said weld joint and simultaneously establishes a second weld arc along said welding path said first and second welding arcs being spaced apart along said welding path up to 6 inches.

30. A method of arc welding, comprising:
providing a first welding waveform to a first electrode;
providing a second welding waveform to a second electrode;
welding a weld joint defined by at least two workpieces, at least one workpiece extending between said first and second electrodes, said welding including welding a first side of said at least one workpiece with said first electrode and simultaneously welding a second side of said at least one workpiece opposite said first side with said second electrode; and
moving the first and second electrodes along said weld joint, said first and second electrodes being spaced apart along said joint by up to about 18 inches.

31. The method of claim 30, wherein first and second electrodes are spaced apart along said joint by up to about 12 inches.

32. The method of claim 31, wherein first and second electrodes are spaced apart along said joint by up to about 6 inches.

33. The method of claim 32, wherein first and second electrodes are spaced apart along said joint by up to about 2-3 inches.

34. The method of claim 33, wherein first and second electrodes are spaced apart along said joint by up to about 2 inches.

35. A method of arc welding a weld joint defined by a base metal comprising:
applying a first AC welding waveform to a first welding electrode;
simultaneously applying a second AC welding waveform to a second welding electrode such that a current transfers between said first and second electrode to deposit a material in a weld joint defined by a base material extending between said first and second welding electrodes.

36. A method of arc welding, comprising:
providing a first AC welding waveform to a first electrode;
providing a second AC welding waveform to a second electrode;
welding a weld joint in an interface between a first base metal and a second base metal, each of the first and second base metals defining a first side and a second side opposite the first side of the base metal, the interface extending from the first side to the second side of at least one of the first and second base metals, the interface being disposed between said first and said second electrodes such that the first electrode is disposed on the first side of the at least one base metal and the second electrode is disposed on the second side of the at least one electrode;

transferring a current flow over one cycle of said first and said second welding waveforms in a direction being at least one of:
(a) from said first electrode to said second electrode;
(b) from said second electrode to said first electrode;
(c) through said base material to a common node to said first and second electrodes; and moving the first and second electrodes along the weld joint in a same direction and at or near a same speed.

37. The method of claim 31, wherein each of said first and said second waveforms defines an offset and a wave balance, at least one of said offset and said wave balance of said first waveform is different from said offset and wave balance of said second waveform.

\* \* \* \* \*